United States Patent
Yang

(10) Patent No.: US 10,455,673 B1
(45) Date of Patent: Oct. 22, 2019

(54) LIGHT STRING WITH A NON-EXTINGUISHING FUNCTION AND AN INDEPENDENT LED BLINKING FUNCTION

(71) Applicant: Jetmax Lighting Industrial Co., Limited, Dongguan (CN)

(72) Inventor: Ping Yang, Dongguan (CN)

(73) Assignee: Jetmax Lighting Industrial Co., Limited, Dongguan, Guangdong (CN)

( * ) Notice: Subject to any disclaimer, the term of this patent is extended or adjusted under 35 U.S.C. 154(b) by 0 days.

(21) Appl. No.: 16/260,549

(22) Filed: Jan. 29, 2019

(51) Int. Cl.
| | |
|---|---|
| H05B 37/02 | (2006.01) |
| F21S 4/10 | (2016.01) |
| H05B 33/08 | (2006.01) |
| F21Y 115/10 | (2016.01) |
| F21W 121/00 | (2006.01) |
| F21V 23/04 | (2006.01) |

(52) U.S. Cl.
CPC .............. *H05B 37/029* (2013.01); *F21S 4/10* (2016.01); *H05B 33/083* (2013.01); *H05B 33/0815* (2013.01); *H05B 33/0857* (2013.01); *H05B 37/0281* (2013.01); *F21V 23/0407* (2013.01); *F21W 2121/00* (2013.01); *F21Y 2115/10* (2016.08); *H05B 33/0845* (2013.01)

(58) Field of Classification Search
CPC ........................ F21V 23/0407; H05B 33/0845
USPC ...................................... 315/185 R
See application file for complete search history.

(56) References Cited

U.S. PATENT DOCUMENTS

| | | | | |
|---|---|---|---|---|
| 6,285,140 B1* | 9/2001 | Ruxton | .............. | H05B 33/0803 |
| | | | | 315/291 |
| 8,203,275 B2* | 6/2012 | Ruxton | .............. | H05B 33/0824 |
| | | | | 315/185 R |
| 8,680,773 B2* | 3/2014 | Hering | ............... | H01R 13/6641 |
| | | | | 315/185 R |
| 10,314,127 B2* | 6/2019 | Zheng | ................ | H05B 33/0857 |
| 2006/0198143 A1 | 9/2006 | Cheung | | |

FOREIGN PATENT DOCUMENTS

| | | |
|---|---|---|
| CN | 1804455 A | 7/2006 |
| CN | 100472118 C | 3/2009 |
| CN | 205746248 U1 | 11/2016 |

\* cited by examiner

*Primary Examiner* — Thuy V Tran

(74) *Attorney, Agent, or Firm* — Thomas J. Nikolai; DeWitt LLP

(57) ABSTRACT

A light string with a non-extinguishing function and an independent LED blinking function includes an LED light string having a plurality of LED bidirectional lamp groups and a plurality of LED independent blinking lamp groups connected in series, and a switchable-polarity power supply connected to the LED light string for providing a pair of DC voltages with switchable polarity to the LED light string. The LED bidirectional lamp group includes a plurality of LED bidirectional lamps connected in parallel, and the LED independent blinking lamp group includes a blinking control circuit and a plurality of LED bidirectional lamps connected in parallel. The plurality of LED bidirectional lamps may be a plurality of LED two-color bidirectional lamps or LED mono-color bidirectional lamps; and the blinking control circuit controls the plurality of LED bidirectional lamps to blink independently and to cyclically vary the brightness of the plurality of LED bidirectional lamps.

11 Claims, 11 Drawing Sheets

LIGHT STRING WITH A NON-EXTINGUISHING FUNCTION AND AN INDEPENDENT LED BLINKING FUNCTION

BACKGROUND OF THE INVENTION

1. Field of the Invention

The present invention relates to the field of LED decorative light technology, and particularly to a light string with a non-extinguishing function and an independent LED blinking function.

2. Description of the Related Art

A light emitting diode (LED) is a semiconductor device that converts electrical energy into light with extremely high efficiency. LEDs can also emit light of various colors. Therefore, LEDs have the merits of power saving, low heat generation, long lifetime, high brightness, and multi-color. Currently, LEDs have been widely used in common lighting and decorative lighting.

At present, most of the LED decorative light strings adopt the way of firstly connecting a plurality of LED lamps in series to form an LED light string, and then connecting multiple LED light strings in parallel, such a "serial first then parallel" connection structure as the above-mentioned, will result in the following unfavorable situation that if any individual LED lamp fails or falls off from an LED light string, the entire LED light string will be off, and that will cause waste of the good LED lamps remaining in the LED light string, not to mention affecting the overall lighting and visual effects disproportionally. Furthermore, the conventional LED decorative string products usually have relatively simple and monotonic visual effects; for example, the entire LED light string may only emit light of a single color or blink at a fixed rate.

SUMMARY OF THE INVENTION

The purpose of the present invention is to ameliorate aforesaid shortcomings of the conventional LED decorative light strings by providing a light string with a non-extinguishing function and an independent LED blinking function disclosed herein.

The light string with a non-extinguishing function and an independent LED blinking function of the present invention includes:

an LED light string including two voltage input terminals, a plurality of LED bidirectional lamp groups, and a plurality of LED independent blinking lamp groups connected in series;

a switchable polarity power supply having two DC voltage output terminals respectively connected to the two voltage input terminals of the LED light string for providing a pair of DC voltages with switchable polarity to the LED light string;

wherein, each LED bidirectional lamp group includes a plurality of LED bidirectional lamps connected in parallel, and each LED independent blinking lamp group includes a blinking control circuit and a plurality of LED bidirectional lamps connected in parallel;

wherein the plurality of LED bidirectional lamps connected in parallel of each LED bidirectional lamp group may be a plurality of LED two-color bidirectional lamps connected in parallel or a plurality of LED mono-color bidirectional lamps connected in parallel; the plurality of LED bidirectional lamps connected in parallel of each LED independent blinking lamp group may be the plurality of LED two-color bidirectional lamps connected in parallel or the plurality of LED mono-color bidirectional lamps connected in parallel;

wherein, the blinking control circuit controls the plurality of LED bidirectional lamps connected in parallel, so that when the plurality of LED bidirectional lamp groups emit light, the plurality of LED bidirectional lamps connected in parallel in the plurality of LED independent blinking lamp groups will blink independently;

wherein the blinking control circuit cyclically adjusts the plurality of LED bidirectional lamps connected in parallel to change from normal brightness to darkness within a T1 period, and then to remain in darkness for a T2 period, and then to change from darkness to normal brightness in a T3 period.

According to the above disclosed light string with a non-extinguishing function and an independent LED blinking function, the present invention adopts the way of firstly parallel connecting LED lamps into an LED lamp group, and then connecting the LED lamp groups in series to form an LED light string, so that when individual LED lamps of the LED lamp group fail or fall off, they will not affect the supplying of power to the other LED lamps of the LED light string and the decoration effect of the LED light string is only proportionally affected, and therefore the non-extinguishing function of the LED light string can be realized to achieve the purpose of the present invention. Furthermore, the LED lamp group includes the LED independent blinking lamp groups and the LED two-color bidirectional lamp group which is capable of emitting light of changeable colors; the LED independent blinking lamp groups can realize the function of cycling of normal brightness, fading to darkness and gradually back to normal brightness, and the LED independent blinking lamp groups can also realize the function of constant normal lighting. Each LED independent blinking lamp group can be programmed separately to achieve independent blinking functions. The LED two-color bidirectional lamp groups and the LED independent blinking lamp groups together can endow the LED light string with much richer visual effects to overcome the monotonic visual effect of conventional decorative LED light strings, and thereby achieving the purposes of the present invention.

DETAILED DESCRIPTION OF THE INVENTION

These and other aspects of the embodiments herein will be better appreciated and understood when considered in conjunction with the following description and the accompanying drawings.

Figure 1:
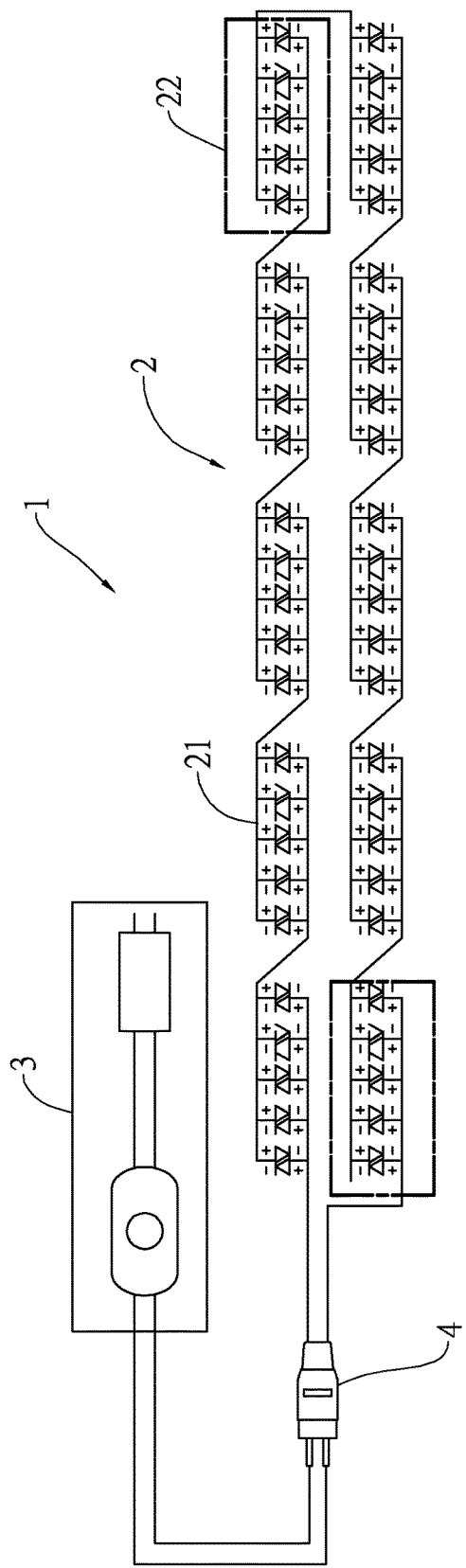
FIG. 1 is the structural view of Embodiment 1 of the present invention.

With reference to FIG. 1, the present invention is a light string with a non-extinguishing function and an independent LED blinking function 1 which includes: an LED light string 2, a switchable polarity power supply 3 and a first connection plug 4. The first connection plug 4 is used for connecting the LED light string 2 and the switchable polarity power supply 3.

Figure 2:
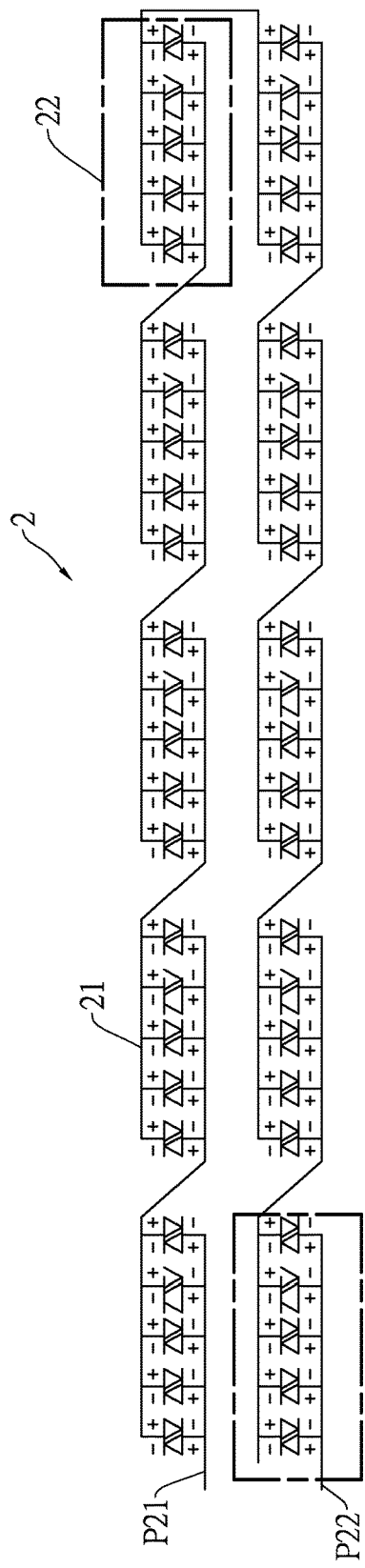
FIG. 2 is the circuit diagram of an LED light string of the present invention.

With reference to FIG. 2, the LED light string 2 includes two voltage input terminals P21, P22 and N LED bidirectional lamp groups 21 and M LED independent blink lamp groups 22, where M and N are positive integers, for example M=8, N=2.

Figure 3:
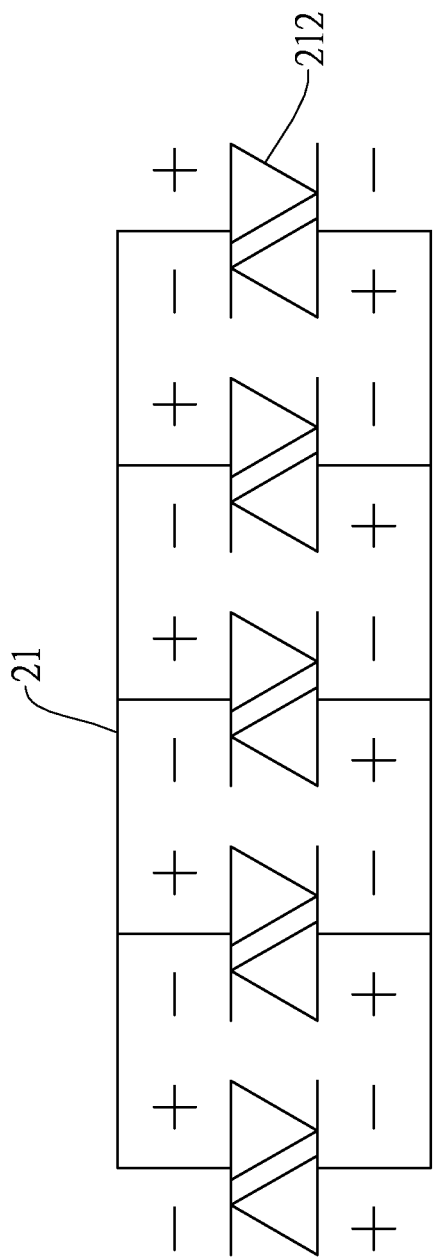
FIG. 3 is the circuit diagram of the LED bidirectional lamp group of the present invention.

With reference to FIG. 3, each LED bidirectional lamp group 21 includes A parallel LED bidirectional lamps 212, where A is a positive integer, for example A=5.

Figure 4A:
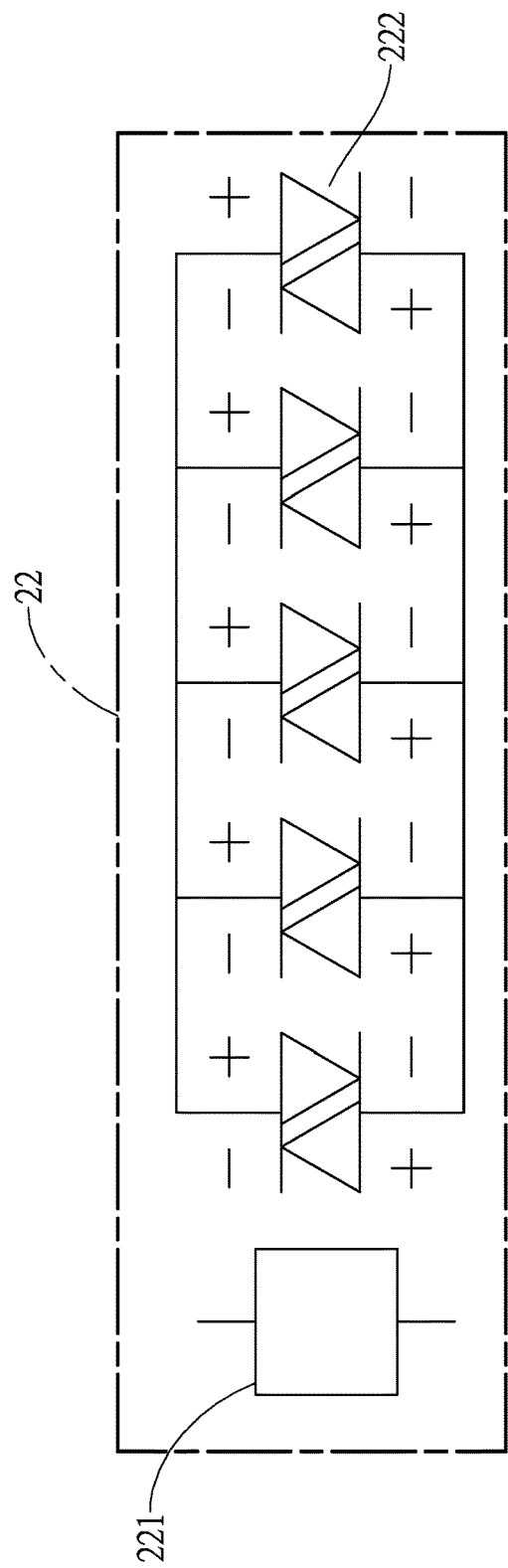
FIG. 4A is the schematic view of the LED independent blinking lamp group of the present invention.
Figure 4B:
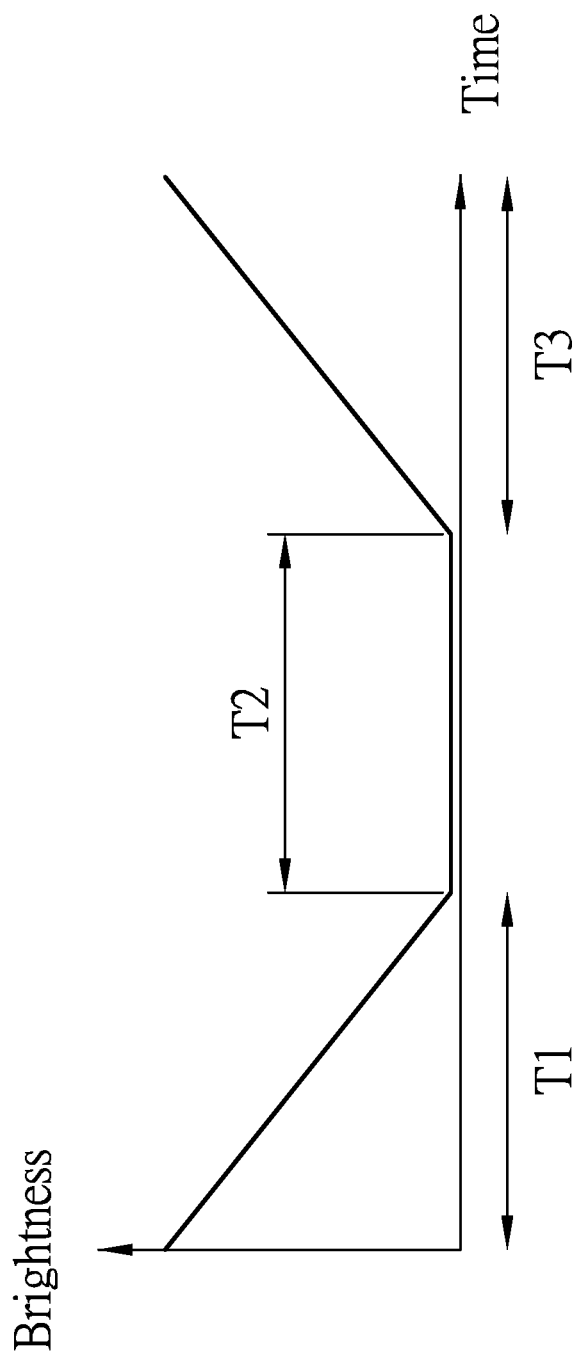
FIG. 4B shows the cycle of brightness change for the LED independent blinking lamp group of the present invention.

With reference to FIG. 4A and FIG. 4B, each LED independent blinking lamp group 22 includes a blinking control circuit 221 and B LED bidirectional lamps 222 connected in parallel, where B is a positive integer, for example B=5. The blinking control circuit 221 controls the B LED bidirectional lamps 222 such that when the N LED bidirectional lamp groups 21 emit light, the B LED bidirectional lamps 222 connected in parallel of any one of the LED independent blinking lamp groups 22 are blinking independently. For example, the blinking control circuit 221 in the LED independent blinking lamp group 22 controls the cycle of adjusting the B LED bidirectional lamps 222 connected in parallel to gradually change from normal brightness to darkness during a T1 period and then to keep the darkness for a T2 period, and then to gradually change from darkness to normal brightness in a T3 period. For example, the T1 period, the T2 period, and the T3 period may each be from 0.5 to 5 seconds, and more preferably, the T1 period, the T2 period and the T3 period are 1.25 seconds each.

Figure 5:
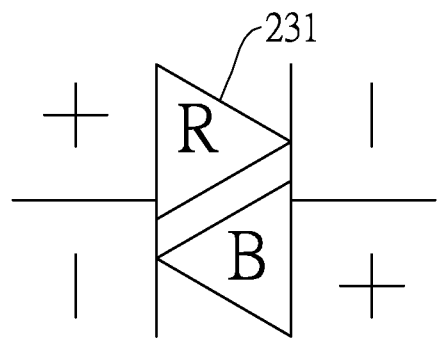
FIG. 5 is the circuit diagram of the LED bi-color bidirectional lamp of the present invention.

With reference to FIG. 5, FIG. 5 shows an LED two-color bidirectional lamp 231 having two common terminals and two LEDs of different colors, such as a red LED and a blue LED; the red LED and the blue LED are connected in parallel with opposite polarities. The LED two-color bidirectional lamp 231 can be bi-directionally driven, and the LED two-color bidirectional lamp 231 emits light of different colors according to the polarity of the applied voltage between the two common terminals.

Figure 6:
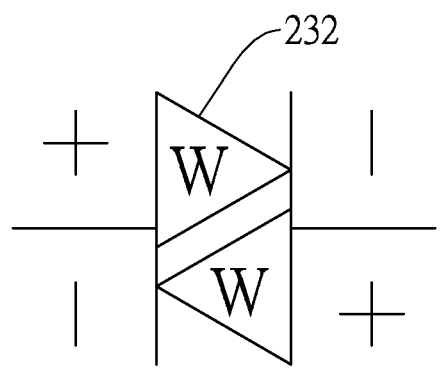
FIG. 6 is the circuit diagram of the LED mono-color bidirectional lamp of the present invention.

With reference to FIG. 6, FIG. 6 shows an LED mono-color bidirectional lamp 232 having two LEDs of the same color and two common terminals, for example, white LEDs, and the two white LEDs are connected in parallel with opposite polarities. The LED mono-color bidirectional lamp 232 can be bi-directionally driven to emit light of the same color regardless of the polarity of the applied voltage between the two common terminals.

Figure 7:
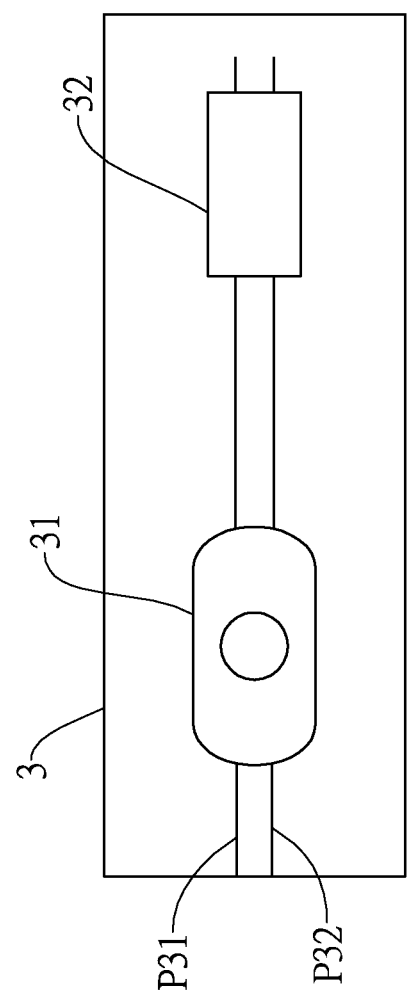
FIG. 7 is the switchable polarity power supply of the present invention.

With reference to FIG. 1, FIG. 2 and FIG. 7, the switchable polarity power supply 3 includes a controller 31 and a voltage converter 32. The voltage converter 32 provides a direct current (DC) power supply to the controller 31. The switchable polarity power supply 3 has two DC voltage output terminals P31, P32. And through the first connection plug 4, the two DC voltage output terminals P31, P32 are respectively connected to the two voltage input terminals P21, P22 of the LED light string 2 for providing a pair of DC voltages with switchable polarity.

Figure 8:
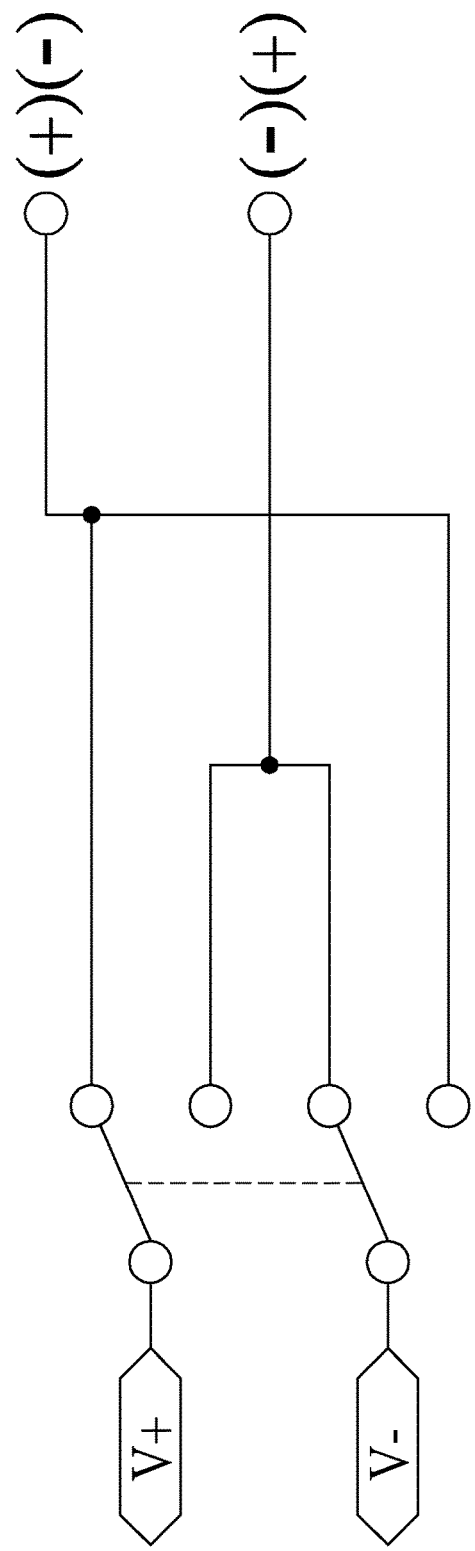
FIG. 8 is a schematic diagram indicating the function of the switchable polarity power supply in the present invention.

With reference to FIG. 8, the switchable polarity power supply 3 has equivalent function as the switching device shown in FIG. 8, and depending on the setting of the switch, the switchable polarity power supply 3 can output a pair of voltages having the same polarity as that of an input pair of voltages V+, V−, or the switchable polarity power supply 3 can output a pair of voltages having the opposite polarities as that of the pair of input voltages V+, V−.

Figure 9:
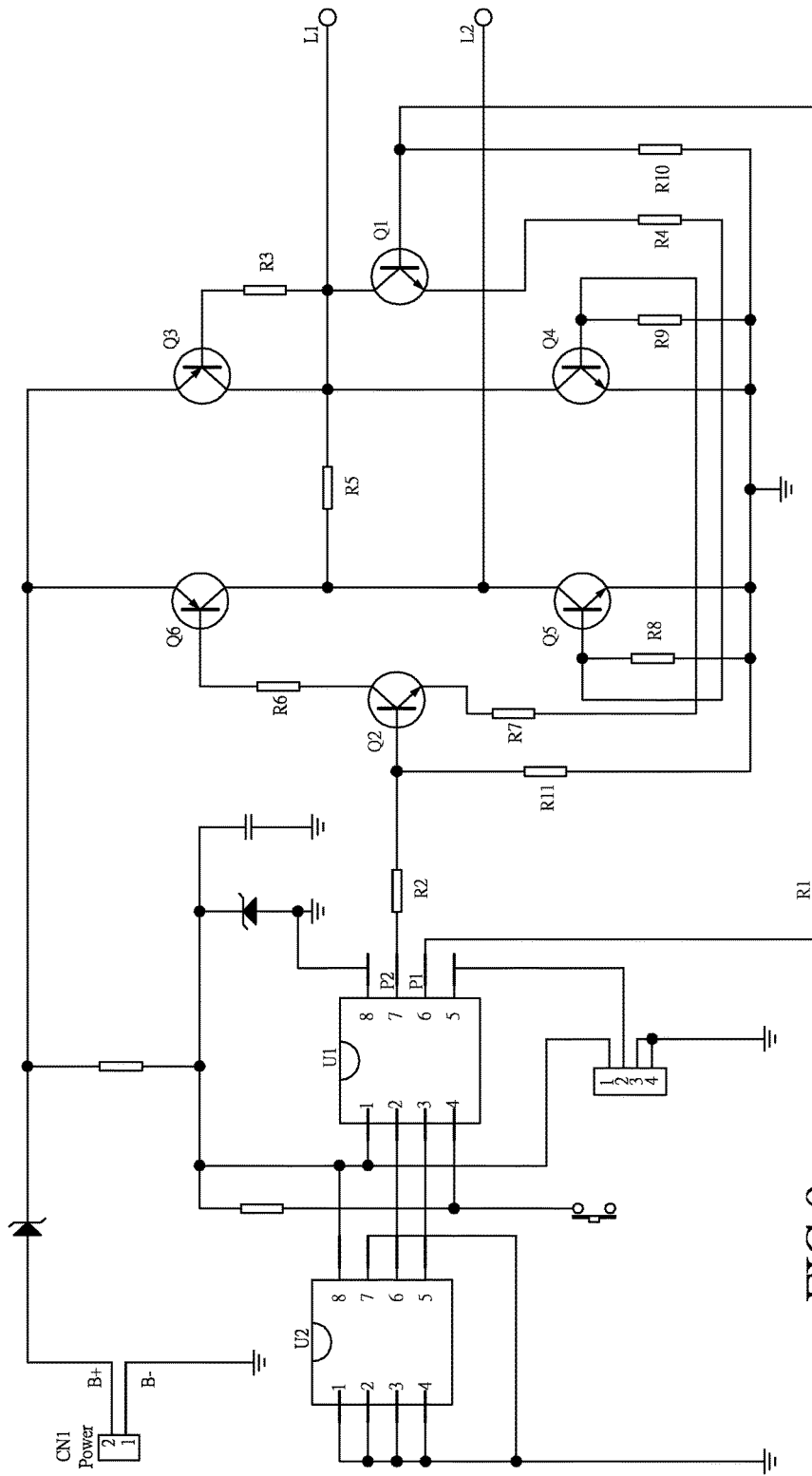
FIG. 9 is the circuit diagram of the controller of the present invention.

With reference to FIG. 9, the controller 31 includes a first output terminal L1 and a second output terminal L2, a microcontroller unit U1, a memory unit U2, a plurality of transistors, and a plurality of resistors. The microcontroller unit U1 further includes a first output pin P1 and a second output pin P2. The memory unit U2 provides a setting to the microcontroller unit U1, and according to the setting, the microcontroller unit U1 outputs a control signal through the first output pin P1 and the second output pin P2 to control the state of the plurality of transistors, and through the first output terminal L1 and the second output terminal L2, the pair of DC voltages with switchable polarity is outputted to the two DC voltage output terminals P31, P32 of the switchable polarity power supply 3 so as to provide polarity-switchable DC power to the LED light string 2 for lighting on the LED light string 2, and especially, for lighting on the LED bidirectional lamps 212, 222 of the LED light string 2.

With reference to FIG. 9, the transistors included in the controller 31 are the first to the sixth transistors Q1 to Q6, wherein the first transistor Q1, the second transistor Q2, the fourth transistor Q4, and the fifth transistor Q5 are NPN bipolar junction transistors, whereas the third transistor Q3 and the sixth transistor Q6 are PNP bipolar junction transistors. The resistors included in the controller 31 are the first to the eleventh resistors R1 to R11. It is common knowledge that other types of transistors such as MOSFET (metal oxide semiconductor field effect transistor) and JFET (junction filed effect transistor) can also be used to replace the above-mentioned bipolar junction transistors shown in FIG. 9.

With reference to FIG. 9, the first output terminal L1 is connected to the collector of the first transistor Q1, the collector of the third transistor Q3, and the collector of the fourth transistor Q4; and through the third resistor R3, the first output terminal L1 is connected to the base of the third transistor Q3; and through the fifth resistor R5, the first output terminal L1 is connected to the collector of the sixth transistor Q6, the collector of the fifth transistor Q5 and the second output terminal L2; and through the fourth resistor R4, the emitter of the first transistor Q1 is connected to the base of the fifth transistor Q5; and through the eighth resistor R8, the base of the fifth transistor Q5 is connected to ground; and through the seventh resistor R7, the emitter of the second transistor Q2 is connected to the base of the fourth transistor Q4; and through the ninth resistor R9, the base of the fourth transistor Q4 is connected to ground; the base of the first transistor Q1 is connected to ground via a tenth resistor R10; and the emitter of the fourth transistor Q4 and the emitter of the fifth transistor Q5 are directly connected to ground. The base of the first transistor Q1 is connected to the first output pin P1 of the microcontroller unit U1 via a first resistor R1, and the base of the second transistor Q2 is connected to the second output pin P2 of the microcontroller unit U1 via a second resistor R2. And through the eleventh resistor R11, the base of the second transistor Q2 is connected to ground; and through the sixth resistor R6, the base of the sixth transistor Q6 is connected to the collector of the second transistor Q2. The emitter of the sixth transistor Q6 and the emitter of the third transistor Q3 are directly connected to the DC power provided by the voltage converter 32.

Figure 10:
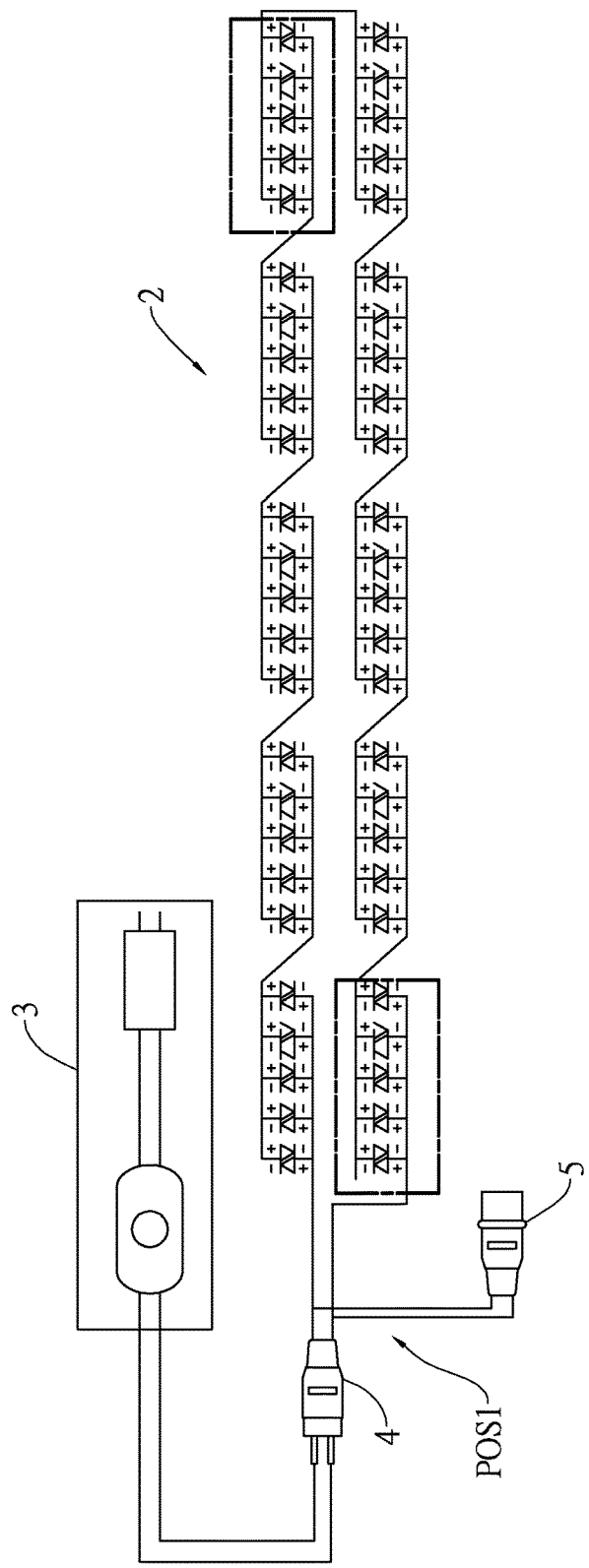
FIG. 10 is the structural view of Embodiment 2 of the present invention.

In the second preferred embodiment of the present invention, referring to FIG. 10, the light string with a non-extinguishing function and an independent LED blinking function 1 is augmented with a second connection plug 5. The second connection plug 5 can be connected in parallel with the first connection plug 4 at a first position POS1, and the first position POS1 is a position adjacent to the first connection plug 4. The second connection plug 5 can be connected to the first connection plug 4 of another LED light string 2, and thereby a plurality of LED light strings 2 can be easily connected in parallel, in this way.

Figure 11:
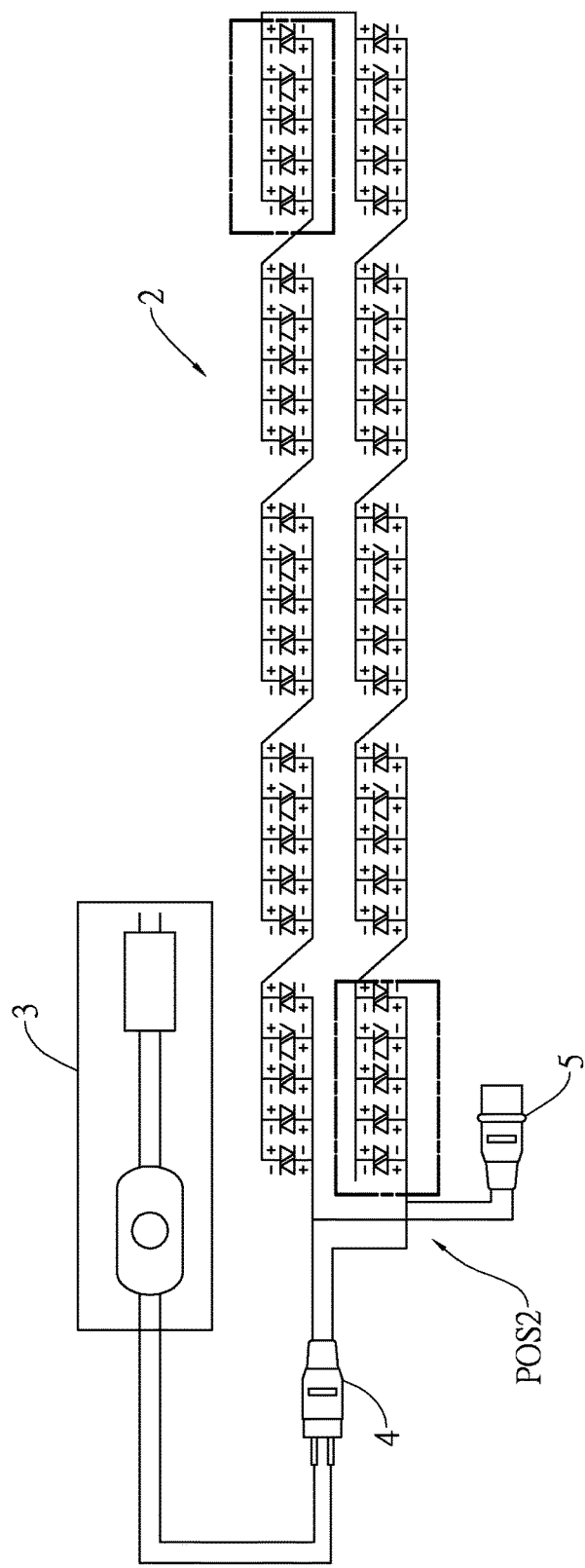
FIG. 11 is the structural view of Embodiment 3 of the present invention.

In the third preferred embodiment of the present invention, referring to FIG. 11, the second connection plug 5 may also be connected in parallel with the first connection plug 4 at a second position POS2, and the second position POS2 is a position adjacent to the two voltage input terminals P21, P22 of the LED light string 2. The second connection plug 5 can also be connected to the first connection plug 4 of another LED light string 2, so that a plurality of LED light strings 2 can be easily connected in parallel, in this way.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A light string with a non-extinguishing function and an independent LED blinking function, including:
    an LED light string including two voltage input terminals, a plurality of LED bidirectional lamp groups, and a plurality of LED independent blinking lamp groups connected in series;
    a switchable polarity power supply having two DC voltage output terminals respectively connected to the two voltage input terminals of the LED light string for providing a pair of DC voltages with switchable polarity to the LED light string;
    wherein, each LED bidirectional lamp group includes a plurality of LED bidirectional lamps connected in parallel;
    wherein, each LED independent blinking lamp group includes a blinking control circuit and a plurality of LED bidirectional lamps connected in parallel.

2. The light string as claimed in claim 1, wherein the plurality of LED bidirectional lamps connected in parallel of each LED bidirectional lamp group is a plurality of LED two-color bidirectional lamps or a plurality of LED mono-color bidirectional lamps; the plurality of LED bidirectional lamps connected in parallel of each LED independent blinking lamp group is the plurality of LED two-color bidirectional lamps or the plurality of LED mono-color bidirectional lamps.

3. The light string as claimed in claim 1, wherein, the blinking control circuit controls the plurality of LED bidirectional lamps connected in parallel included in each LED independent blinking lamp group, so that when the plurality of LED bidirectional lamp groups included in each LED independent blinking lamp group emit light, the plurality of LED bidirectional lamps connected in parallel in the plurality of LED independent blinking lamp groups blink independently.

4. The light string as claimed in claim 3, wherein the blinking control circuit cyclically adjusts the plurality of LED bidirectional lamps connected in parallel included in each LED independent blinking lamp group to change from normal brightness to darkness within a first period, and then to remain in darkness for a second period, and then to change from darkness to normal brightness in a third period.

5. The light string as claimed in claim 4, wherein the first period, second period and third period are each between 0.5 and 5 seconds, or the first period, second period and third period are 1.25 seconds each.

6. The light string as claimed in claim 1, wherein the switchable polarity power supply further includes a controller and a voltage converter, wherein the voltage converter provides a DC power to the controller, the controller includes a first output terminal and a second output terminal, and according to a setting, the controller outputs the pair of DC voltages with switchable polarity to the two DC voltage output terminals of the switchable polarity power supply via the first output terminal and the second output terminal.

7. The light string as claimed in claim 6, wherein the controller further includes a microcontroller unit, a memory unit, a plurality of transistors, and a plurality of resistors; the microcontroller unit includes a first output pin and a second output pin; the memory unit provides the setting to the microcontroller unit, and according to the setting, the microcontroller unit outputs a control signal through the first output pin and the second output pin to control the states of the plurality of transistors to generate and to output the pair of DC voltages with switchable polarity.

8. The light string as claimed in claim 7, wherein, the plurality of transistors include a first transistor to a sixth transistor, wherein the first transistor, the second transistor, the fourth transistor, and the fifth transistor are NPN bipolar junction transistors, and the third transistor and the sixth transistor are PNP bipolar junction transistors; and the plurality of resistors include a first resistor to an eleventh resistor.

9. The light string as claimed in claim 8, wherein the first output terminal (L1) is connected to a collector of the first transistor (Q1), a collector of the third transistor (Q3), and a collector of the fourth transistor (Q4); and through the third resistor (R3), the first output terminal (L1) is also connected to a base of the third transistor (Q3), and through the fifth resistor (R5), the first output terminal (L1) is connected to a collector of the sixth transistor (Q6), a collector of the fifth transistor (Q5) and the second output terminal (L2); through the fourth resistor (R4), an emitter of the first transistor (Q1) is connected to a base of the fifth transistor (Q5), and through the eighth resistor (R8), the base of the fifth transistor (Q5) is connected to ground; through the seventh resistor (R7), an emitter of the second transistor (Q2) is connected to a base of the fourth transistor (Q4), and the base of the fourth transistor (Q4) is connected to the ground through the ninth resistor (R9); a base of the first transistor (Q1) is connected to the ground through the tenth resistor (R10), and an emitter of the fourth transistor (Q4) and an emitter of the fifth transistor (Q5) are both directly connected to the ground; through the first resistor (R1), the base of the first transistor (Q1) is connected to the first output pin (P1) of the microcontroller unit (U1), and through the second resistor (R2), a base of the second transistor (Q2) is connected to the second output pin (P2) of the microcontroller unit (U1); through the eleventh resistor (R11), the base of the second transistor (Q2) is connected to the ground, and through the sixth resistor (R6), a base of the sixth transistor (Q6) is connected to a collector of the second transistor (Q2); an emitter of the sixth transistor (Q6) and an emitter of the third transistor (Q3) are directly connected to the DC power supply provided by the voltage converter.

10. The light string as claimed in claim 1, further including a first connection plug, and through the first connection plug, the two voltage input terminals of the LED light string are respectively connected to the two voltage outputs of the switchable polarity power supply.

11. The light string as claimed in claim 10 further including a second connection plug, the second connection plug is connected to the first connection plug at a first position or at a second position, wherein the first position is adjacent to the first connection plug, and the second position is adjacent to the two voltage input terminals of the LED light string.

* * * * *